Oct. 15, 1929.  T. C. VAN DEGRIFT  1,731,833
BALANCING MACHINE FIXTURE
Filed May 18, 1928  2 Sheets-Sheet 2
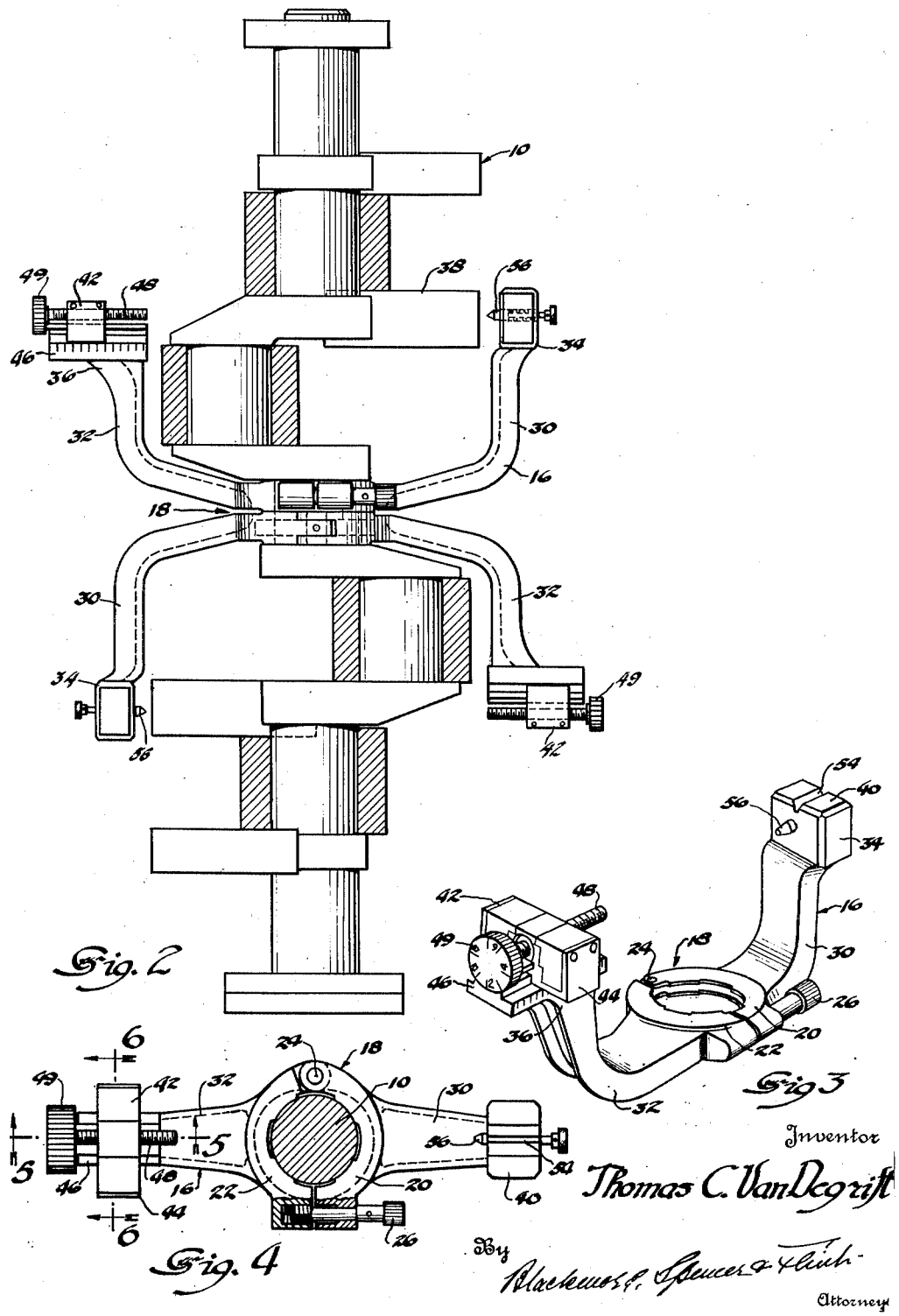

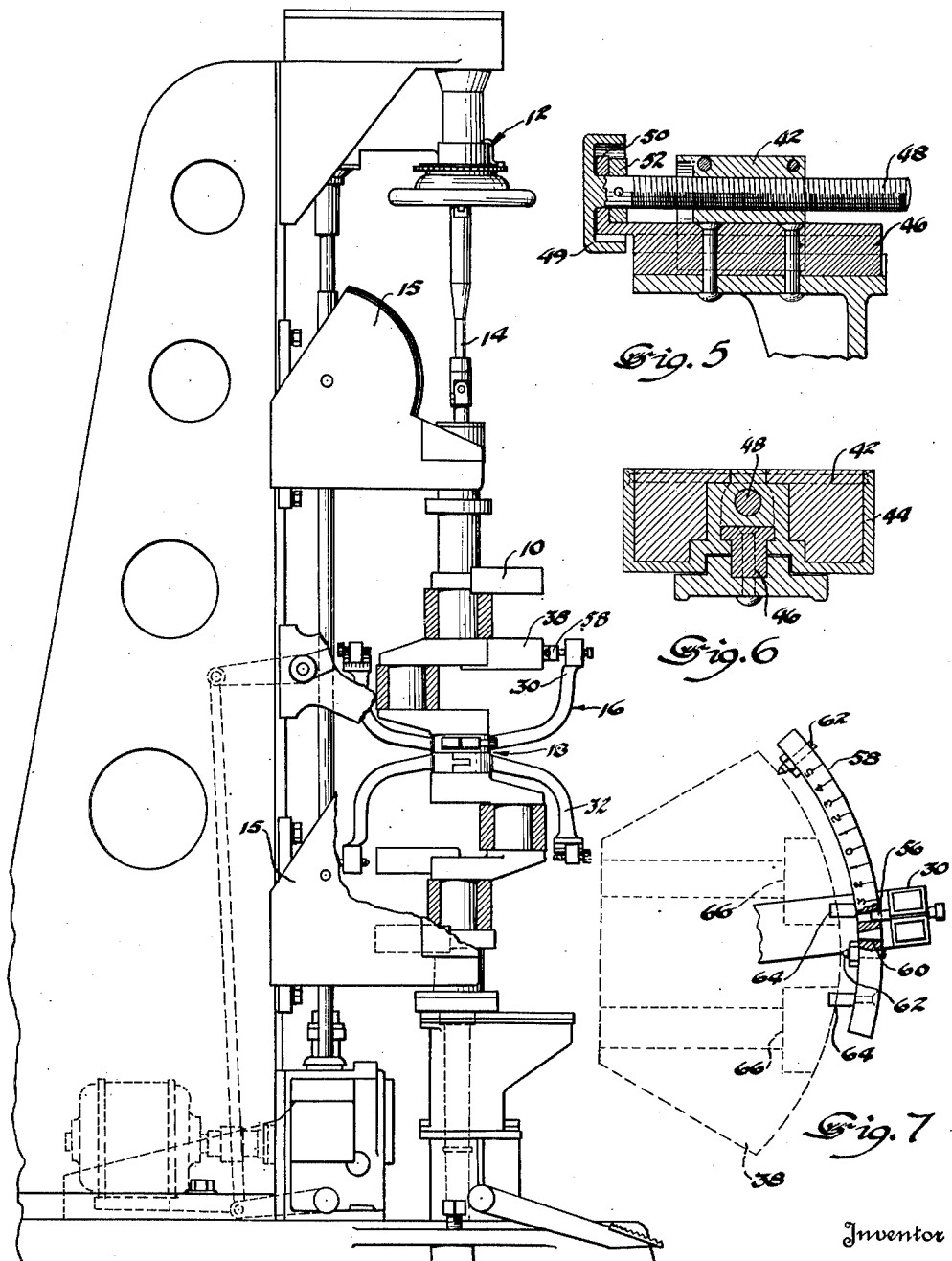

Patented Oct. 15, 1929

1,731,833

UNITED STATES PATENT OFFICE

THOMAS C. VAN DEGRIFT, OF DETROIT, MICHIGAN, ASSIGNOR TO GENERAL MOTORS CORPORATION, OF DETROIT, MICHIGAN, A CORPORATION OF DELAWARE

BALANCING-MACHINE FIXTURE

Application filed May 18, 1928. Serial No. 278,722.

This invention has to do with the balancing of rotating parts such as crankshafts and propeller shafts of automobiles. Many types of testing machines have been devised for testing such parts for rotating balance. Such machines are usually provided either with devices for indicating the amount and location out of balance or with attachments to be secured to the rotating part and adjustable so that, in effect, weight may be added to or subtracted from the part to put it in balance. My invention has to do with an attachment of the type last described. The preferred form of my attachment is normally in balance and comprises a fitting adapted to be clamped to one of the journals of a crankshaft, and having oppositely extending arms terminating in offset portions adapted to extend into the radial plane of the shaft where metal may be removed to balance it. The arms are provided with weights at their extremities, one of the weights being adjustable. The attachment itself is adjustable circumferentially of the shaft and, by rotating the shaft and adjusting the weight, weight, in effect may be added to the shaft where necessary to balance it. When the fixture and the weight on the fixture have been adjusted so that the part is in running balance the angular position of the attachment is noted as well as the radial position of the weight and, with this data before him, the machinist may remove metal from the shaft at the proper point to correct the un-balance. It is particularly convenient to locate the adjustable weight in the plane where material may be removed for this involves a minimum of computation and thereby greatly reduces the possibility of error.

In the case of crankshafts it is usually desirable to remove excess metal from one of the counterweights. Sometimes the attachment, when adjusted for balance, will indicate that metal should be removed from a place on the counterweight, such as at one of the securing bolts, where it is not feasible to remove it. To take care of this contingency I have provided a proportioning plate for use with my attachment to give the workman data as to the amount of metal which may be removed at two other points and have the same effect as if metal were removed at the single point indicated.

My improved attachment possesses the great advantage that its working is easily understood and unskilled operators rapidly attain great speed in its use. The proportioning plate is also characterized by simplicity and ease of operation.

Figure 1 is a side elevation with parts broken away showing my improved attachments applied to a crankshaft mounted for testing in a balancing machine.

Figure 2 is an enlarged view of the crankshaft and attachments as shown in Figure 1.

Figure 3 is a perspective view of one of the attachments.

Figure 4 is a top plan view of an attachment shown applied to a crankshaft, which appears in section.

Figures 5 and 6 are sections taken on lines 5—5 and 6—6 respectively of Figure 4.

Figure 7 is a view showing the manner of use of the proportioning plate indicated at 58 in Figure 1.

I have illustrated my improved attachment applied to an automobile crankshaft 10 shown mounted in position for testing in a balancing machine 12. In the type of machine illustrated the crankshaft is suspended by means of a universally jointed drive shaft 14 and means (not shown) is provided for holding first one end of the shaft and then the other for rotation about its axis. If the shaft is out of balance the free end performs an eccentric movement and the indicator shown at 15 gives the amount and direction of the eccentricity of the movement. This data when properly corrected to allow for the effect at one end of the shaft of unbalance existing at the other end, informs the machinist how much metal should be removed and where it should be removed to effect balance. It is difficult for the workman to make the necessary, although simple, corrections of the data supplied by the machine, and as this materially slows up the balancing operation, I devised the fixture shown at 16. This fixture comprises a clamping portion 18 including arcuate members 20 and 22 hinged together at 24 and adapted to be detachably secured together at their free ends by any suitable means such as an oscillatable locking bolt as shown at 26. From the arcuate members arms 30 and 32 extend in diametrically opposite directions, the arms having offset ends 34 and 36 respectively extending into the plane of the counterweight 38. The end of the arm 30 carries a fixed mass 40 which may, if desired, be an integral part of the arm. At the free end of the arm 32 a slidable weight 42 is mounted. The slidable weight preferably takes the form of a steel shell 44 filled with lead. It is slidably mounted on a guide 46 secured to the end of arm 32. The guide 46 is provided with an upstanding arm 50 through which projects an adjusting screw 48 having a knurled head 49. A collar 52 secured to the screw adjacent the head confines it for rotary movement only. The slidable weight 42 is in threaded engagement with the screw so that upon rotating of the latter the weight is adjusted along the guide.

The end 34 of the arm 30 is notched as shown at 54 to provide a guide for a marking chalk and is provided with a spring-pressed plunger 56 for a purpose to be explained.

In the use of the device a pair of attachments 16 are applied to the center bearing of the shaft 10 as shown in Figures 1 and 2, with their arms extending into the planes of the adjacent counterweights. The shaft is then tested a second time and further adjustments of the attachments and weights made, if necessary, and the process is repeated until the indicators show balance. If it happens that after the final adjustment the attachment occupies a radial position in which material can conveniently be removed from the counterweight the point is marked on the latter by inserting a piece of chalk in the notch 54 in the end of the arm 30. It will be noted that the mark is made at a point on the counterweight 180 degrees removed from the position of the sliding weight 42. This is because the adjustment of the weight has the effect of adding metal to the shaft and if correction is to be made not by adding metal but by removing it, the removal must necessarily be done at a point 180 degrees from the point at which metal would be added. If it is not practicable to remove metal at the point indicated, it is necessary to make the correction by removing metal at two angularly spaced points on the counterweight where it may be done without harm, the angles and amounts being so chosen that the effect on the balance of the shaft is the same as if metal had been removed at the single point indicated. I have devised the proportioning plate previously referred to as a simple means for providing data as to the points at which metal may be removed and the amount to be removed at each point. The proportioning plate 58, as best shown in Figure 7, is of arcuate shape and is provided with a series of tapering radial holes 60, any one of which is adapted to receive the plunger 56 carried by the arm 30. The holes are numbered consecutively from 1 to 5, on each side of a central zero hole. At the opposite ends of the series of holes are provided hardened steel pins 62 which are used in marking the points on the counterweight at which weight is to be removed. At 64 I have shown a pair of governing pins adapted to project into the countersinks 66 provided in the counterweight 38 for receiving the attaching bolts. The purpose of these governing pins is to insure that the steel pins 62 never come too close to the countersinks.

In the position of the parts shown in Figure 7 it is obviously not feasible to remove metal from the counterweight in the radial plane of the plunger 56 as this plane intersects the head of the bolt occupying the countersink. To find other places on the counterweight at which metal may be removed with the same effect as if it were removed in the plane indicated, the proportioning plate is placed on the counterweight with the governing pins 64 in the bolt countersinks. The plunger 56, being spring-pressed, yields to permit the insertion of the plate. The governing pins permit the plate a slight movement which is, however, sufficient to permit the plunger to fall into one of the tapering holes 60.

In the Figure 7 the plunger is shown seated in the fourth hole and its number is noted for use in drilling, being written on the counterweight opposite the point for the deepest hole. The deepest hole is determined by the position of the proportioning plate. The plate, while in the position described, is wabbled so as to cause the scribing pins 62 to mark lines on the counterweight indicating where the two holes are to be drilled.

Whether one or two holes are to be drilled, data as to the amount of metal to be removed is determined from the position of the sliding weight 42. The head 49 of the adjusting screw is preferably calibrated to give fractional amounts.

This data is likewise marked on the counterweight. The attachments may now be removed and the shaft turned over to the machinist who is equipped with a drill and a chart showing the depths to which two holes are to be drilled, given the number of the tapered hole in the proportioning plate in which the plunger 56 is fitted and a measure of the total weight to be removed as indicated by the position of the sliding weight. The marks of the steel pins 62 indicate where the metal is to be drilled out.

The method of testing for balance above described has proven to be accurate, speedy, and easily understood by workmen.

I claim:
1. A fixture for use in balancing a rotating part, said part having a concentric portion for receiving the fixture and a portion axially spaced from the first named portion at which material may be removed from the part, said fixture comprising means for attachment to the concentric portion of the part permitting circumferential adjustment of the fixture thereon, a support extending from said attaching means into the plane in which material may be removed, and a radially adjustable weight carried by said support.

2. In the combination as defined in claim 1, said attaching means being provided with a second support extending in a direction diametrically opposite the first-named support, said second support being adapted to normally balance said first named support and weight in one position of the latter.

3. The combination of a balancing machine fixture adapted to be secured to a rotating part and adapted to be adjusted thereon to put the part in balance, said fixture being provided with indexing means to indicate the point at which metal is to be removed from the part, and a proportioning plate adapted for interfitting engagement with said indexing means at any one of a plurality of circumferentially spaced points, said plate being provided with spaced means for indicating spaced points on the article where metal may be removed.

4. The combination as defined in claim 3, said proportioning plate being provided with means for limiting the circumferential adjustment of the plate with respect to the body to be balanced to cause the indicating means on the plate to fall within areas on the part from which metal may be removed.

5. In the combination as defined in claim 3, said indicating means comprising scribing members fixed to said plate.

In testimony whereof I affix my signature.

THOMAS C. VAN DEGRIFT.